Patented Jan. 18, 1938

2,105,461

UNITED STATES PATENT OFFICE 2,105,461

PRODUCTION OF RESINS

Albert Bernard Boese, Jr., Pittsburgh, Pa., assignor to Carbide and Carbon Chemicals Corporation, a corporation of New York No Drawing. Application May 8, 1936,
Serial No. 78,641

5 Claims. (Cl. 260—3)

This invention relates to the production of resinous condensation products; and it especially concerns products of this type formed by the condensation of diketene and paraformaldehyde. Such products apparently are polymers of delta lactone, and are viscous tacky resin-like bodies which are insoluble in water, but are soluble in acetone and other ketones; in esters such as ethyl acetate; in aromatic hydrocarbons, such as benzene and toluene; and in aliphatic acids such as glacial acetic acid. Their properties indicate that they have value as plasticizers for various vinyl resins, resinous cellulose derivatives, and other resinous compositions.

The present invention is based in important part upon the discovery that upon reacting diketene and formaldehyde, the expected vinyl methyl ketone is not formed but, instead, there is formed the aforementioned viscous resinous polymers having properties adapting them for various industrial uses.

According to the invention diketene is reacted with paraformaldehyde suspended in a volatile solvent for the diketene which is inert with respect to the reactants. The mixture of reactants is heated to an elevated temperature sufficiently high to dissociate the paraformaldehyde to formaldehyde. Considerable loss in weight of the mixture occurs, due to volatilization of a portion of the paraformaldehyde. The solvent is then removed, preferably by vacuum distillation, and the viscous resinous still residue or product is recovered. This product evidently is a polymer of a delta lactone formed by the aldol condensation of diketene and paraformaldehyde, followed by internal esterification, as indicated by the following equations:

HCHO+CH₃COCH=C=O ⟶ HOCH₂CH₂COCH=C=O n(HOCH₂CH₂COCH=C=O) ⟶ (CH₂CH₂COCH₂CO)ₙ
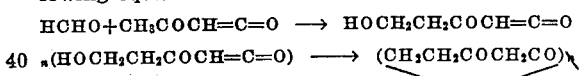

The diketene and paraformaldehyde apparently react in approximately equimolecular proportions. However, in order to facilitate completeness of the condensation reaction, it is desirable to react the diketene with an excess of the paraformaldehyde. The reaction mixture may be permitted to stand at around room temperature for a considerable period of time, often as much as several days or more, before heating the mixture. The reactants and solvent preferably should be water-free to avoid loss of materials by side reactions.

The following example is intended as illustrative only, and considerable departures from the specific steps of the process recited therein may be made, within the purview of the invention:

Example

A suspension of 15 grams of paraformaldehyde and 21 grams of diketene in 25 cc. of dioxan were heated on a water bath to around 100° C. for two hours. The mixture lost 7.5 grams during this period, due to volatilization of paraformaldehyde. No further loss of acid occurred, indicating that the diketene and paraformaldehyde had condensed in equal molecular proportions. The dioxan was removed by distillation under an absolute pressure ranging from 50 to 60 mm. of mercury, and at a temperature that never exceeded 100° C. The residue then was heated under an absolute pressure of from 2 to 3 mm. pressure at 100° C. for 15 minutes to remove the last traces of solvent and unreacted material. The final residue consisted of 25 grams of an extremely viscous, pale yellow, resinous product, evidently a polymer of a delta lactone. It was insoluble in water, but soluble in acetone and other ketones; in esters such as ethyl acetate; in aromatic hydrocarbons such as benzene and toluene; and in aliphatic acids such as glacial acetic acid. It was only slightly soluble in methanol, ethanol, isopropyl ether, and petroleum ether.

Other water-free organic solvents for the diketene may be employed in place of dioxan. Among solvents that are suitable for such use may be mentioned acetone, methyl ethyl ketone, and other ketones; esters such as ethyl acetate; and aromatic hydrocarbons such as benzene and toluene.

Under some conditions it may be advantageous to permit the mixture of reactants in the inert solvent for diketene to stand for some time at room temperature prior to heating the mixture. Thus a mixture containing 30 grams (1 mol.) of paraformaldehyde and 42 grams (.5 mol.) of diketene in 50 cc. of dioxan has been allowed to stand at room temperature for six days, following which the mixture was heated to 100° C. for two hours on a water bath. The dioxan then was removed and the residual resinous product was recovered in the manner described supra in the example. Here also the diketene and paraformaldehyde had condensed in equal molecular proportions.

The condensation reaction may be conducted advantageously in a closed vessel to conserve paraformaldehyde, and in the interest of forming uniform products at all times,—suitable means being utilized to insure continuous intimate contact of the diketene and paraformaldehyde or formaldehyde during the heating of the mixture. This also insures completeness of the reaction.

The action of dilute sodium hydroxide on the delta lactone polymer furnishes important evidence of its constitution. The resin is soluble in dilute caustic solution in the cold, but on heating, a resinous product is formed. When the resulting mixture is acidified, carbon dioxide is evolved, indicating that in cold dilute caustic solution, the sodium salt of a keto acid is formed which, on heating, loses carbon dioxide to form a ketol which then polymerizes.

I claim:

1. Process for the production of resinous condensation products which comprises reacting diketene and paraformaldehyde, and removing the volatile constituents from the resultant reaction mixture.

2. Process which comprises reacting diketene and paraformaldehyde in the presence of an inert organic solvent, removing the volatile constituents from the resultant reaction mixture by distillation, and recovering the residual resinous polymer.

3. Process which comprises reacting diketene and paraformaldehyde in approximately equimolecular proportions in the presence of an inert solvent for the diketene, removing the volatile constituents from the resultant reaction mixture under vacuum, and recovering the residual resinous polymer.

4. Process which comprises maintaining a mixture of diketene and paraformaldehyde in an inert volatile solvent for the diketene at approximately room temperature for a substantial period of time, thereafter heating and refluxing the reaction mixture, and finally distilling off the solvent from the residual resinous condensation product.

5. A viscous, tacky, resin-like polymer produced by reacting diketene and formaldehyde in the presence of an inert volatile solvent.

ALBERT BERNARD BOESE, JR.